United States Patent
Itoh

(10) Patent No.: US 10,703,139 B2
(45) Date of Patent: *Jul. 7, 2020

(54) TIRE

(71) Applicant: BRIDGESTONE CORPORATION, Chuo-ku, Tokyo (JP)

(72) Inventor: Yuki Itoh, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/514,531

(22) PCT Filed: Sep. 29, 2015

(86) PCT No.: PCT/JP2015/077611
§ 371 (c)(1),
(2) Date: Mar. 27, 2017

(87) PCT Pub. No.: WO2016/052563
PCT Pub. Date: Apr. 7, 2016

(65) Prior Publication Data
US 2017/0210167 A1    Jul. 27, 2017

(30) Foreign Application Priority Data
Sep. 29, 2014  (JP) .................................. 2014-199162

(51) Int. Cl.
| | |
|---|---|
| *B60C 1/00* | (2006.01) |
| *B60C 5/00* | (2006.01) |
| *B60C 5/01* | (2006.01) |
| *B60C 5/14* | (2006.01) |
| *C08G 69/36* | (2006.01) |
| *C08G 69/40* | (2006.01) |
| *C08L 21/00* | (2006.01) |

(52) U.S. Cl.
CPC ................ *B60C 5/007* (2013.01); *B60C 1/00* (2013.01); *B60C 1/0041* (2013.01); *B60C 5/01* (2013.01); *B60C 5/14* (2013.01); *C08G 69/36* (2013.01); *C08G 69/40* (2013.01); *C08L 21/00* (2013.01)

(58) Field of Classification Search
CPC ....................................................... B60C 5/007
See application file for complete search history.

(56) References Cited

U.S. PATENT DOCUMENTS

| | | |
|---|---|---|
| 4,873,296 A | 10/1989 | Ciaperoni et al. |
| 9,683,080 B2 | 6/2017 | Fudemoto et al. |
| 10,017,007 B2 | 7/2018 | Fudemoto et al. |

(Continued)

FOREIGN PATENT DOCUMENTS

| | | |
|---|---|---|
| CN | 102939210 A | 2/2013 |
| CN | 103189215 A | 7/2013 |

(Continued)

OTHER PUBLICATIONS

Extended European Search Report dated Jul. 12, 2017, issued in corresponding EP Patent Application EP 15847351.2.

(Continued)

*Primary Examiner* — Peter F Godenschwager
(74) *Attorney, Agent, or Firm* — SOLARIS Intellectual Property Group, PLLC

(57) ABSTRACT

A tire includes a circular tire frame including a resinous material. The resinous material includes a thermoplastic elastomer including a hard segment (HS) and a soft segment (SS), and 55% or more of molecular chain terminals of the thermoplastic elastomer are hard segments (HS).

13 Claims, 3 Drawing Sheets

(56) References Cited

U.S. PATENT DOCUMENTS

| | | |
|---|---|---|
| 2007/0172670 A1 | 7/2007 | Mutsuda et al. |
| 2012/0214933 A1 | 8/2012 | Lopez et al. |
| 2013/0072621 A1 | 3/2013 | Albad et al. |
| 2013/0203889 A1 | 8/2013 | Lopitaux et al. |
| 2013/0206301 A1 | 8/2013 | Fudemoto et al. |
| 2014/0227499 A1 | 8/2014 | Kwon et al. |
| 2016/0023515 A1 | 1/2016 | Fudemoto et al. |
| 2016/0039973 A1 | 2/2016 | Honjo et al. |
| 2016/0046152 A1 | 2/2016 | Fudemoto et al. |
| 2016/0046764 A1 | 2/2016 | Fudemoto et al. |
| 2016/0303905 A1 | 10/2016 | Fudemoto |
| 2017/0217251 A1 | 8/2017 | Itoh |
| 2017/0232796 A1 | 8/2017 | Itoh |
| 2017/0291991 A1 | 10/2017 | Itoh et al. |
| 2017/0298182 A1 | 10/2017 | Kyo |
| 2017/0298189 A1 | 10/2017 | Itoh et al. |
| 2017/0320359 A1 | 11/2017 | Kyo et al. |

FOREIGN PATENT DOCUMENTS

| | | |
|---|---|---|
| CN | 106715596 A | 5/2017 |
| EP | 2980120 A1 | 2/2016 |
| EP | 3199593 A1 | 8/2017 |
| JP | S61-162528 A | 7/1986 |
| JP | 4700927 B2 | 6/2011 |
| JP | 2012-046030 A | 3/2012 |
| JP | 2012-531486 | 12/2012 |
| JP | 2013-521360 | 6/2013 |
| JP | 2014-037551 A | 2/2014 |
| JP | 2014-198779 A | 10/2014 |

OTHER PUBLICATIONS

Search Report of the Chinese office action dated Jul. 23, 2018, from the SIPO in a Chinese patent application corresponding to the instant patent application.

Arun, A. et al., " Tri-block copolymers with mono-disperse crystallizable diamide segments: Synthesis, analysis and theological properties", Polymer, vol. 49, No. 10, p. 2461-2470, May 13, 2008.

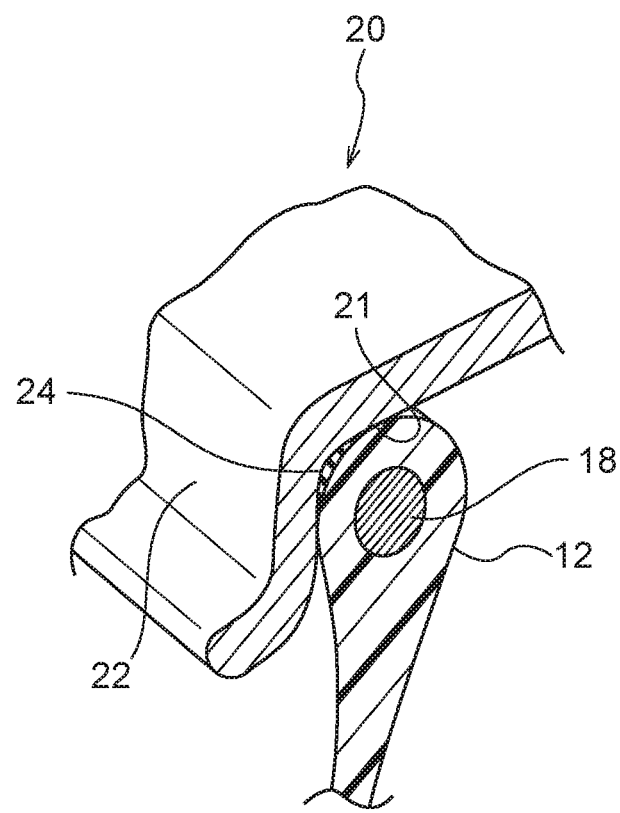

TIRE

TECHNICAL FIELD

The present invention relates to a tire to be mounted on a rim, and particularly relates to a tire in which at least a portion of a tire case is formed of a resinous material.

BACKGROUND ART

Pneumatic tires composed of, for example, rubber, an organic fiber material and a steel member have been used in vehicles such as passenger cars.

Use of resin materials, such as thermoplastic resins and thermoplastic elastomers in particular, as tire materials has been studied in recent years, considering that the resins have light weights, high moldability, and high recyclability. These thermoplastic polymer materials (for example, thermoplastic elastomers and thermoplastic resin materials) have many advantages from the viewpoint of improving productivity, such as being injection moldable. For example, Japanese Patent Application Laid-Open (JP-A) No. 2012-46030 proposes a tire produced using a polyamide-based thermoplastic elastomer as a thermoplastic polymer material.

SUMMARY OF INVENTION

Technical Problem

A tire produced using a thermoplastic polymer material can be easily produced and less expensive, compared to conventional rubber tires. However, there is room for improvement from the viewpoint of providing low rolling resistance (low-loss property), compared to conventional rubber tires. Furthermore, it is requested that production of tires using thermoplastic elastomers realizes performance comparable to that of conventional rubber tires, as well as realizes high production efficiency and low cost.

Furthermore, tires in which thermoplastic elastomers are used are desired to have excellent properties with respect to both of the elastic modulus and the low-loss property, which are performance characteristics of tires, thereby making both characteristics compatible.

In view of the above circumstances, an object of the present invention is to provide a tire that is formed using a resinous material and that achieves a desirable elastic modulus as well as an excellent low-loss property.

Solution to Problem

[1] A tire including a circular tire frame including a resinous material, the resinous material including a thermoplastic elastomer including a hard segment (HS) and a soft segment (SS), and 55% or more of the molecular chain terminals of the thermoplastic elastomer being hard segments (HS).

Advantageous Effects of Invention

According to the invention, a tire that is formed using a resinous material and that achieves a desirable elastic modulus as well as an excellent low-loss property can be provided.

BRIEF DESCRIPTION OF DRAWINGS

FIG. 1B is a cross-sectional view of a bead portion of a tire according to one embodiment of the invention in a state in which the bead portion is mounted on a rim.

DESCRIPTION OF EMBODIMENTS

Figure 1A:
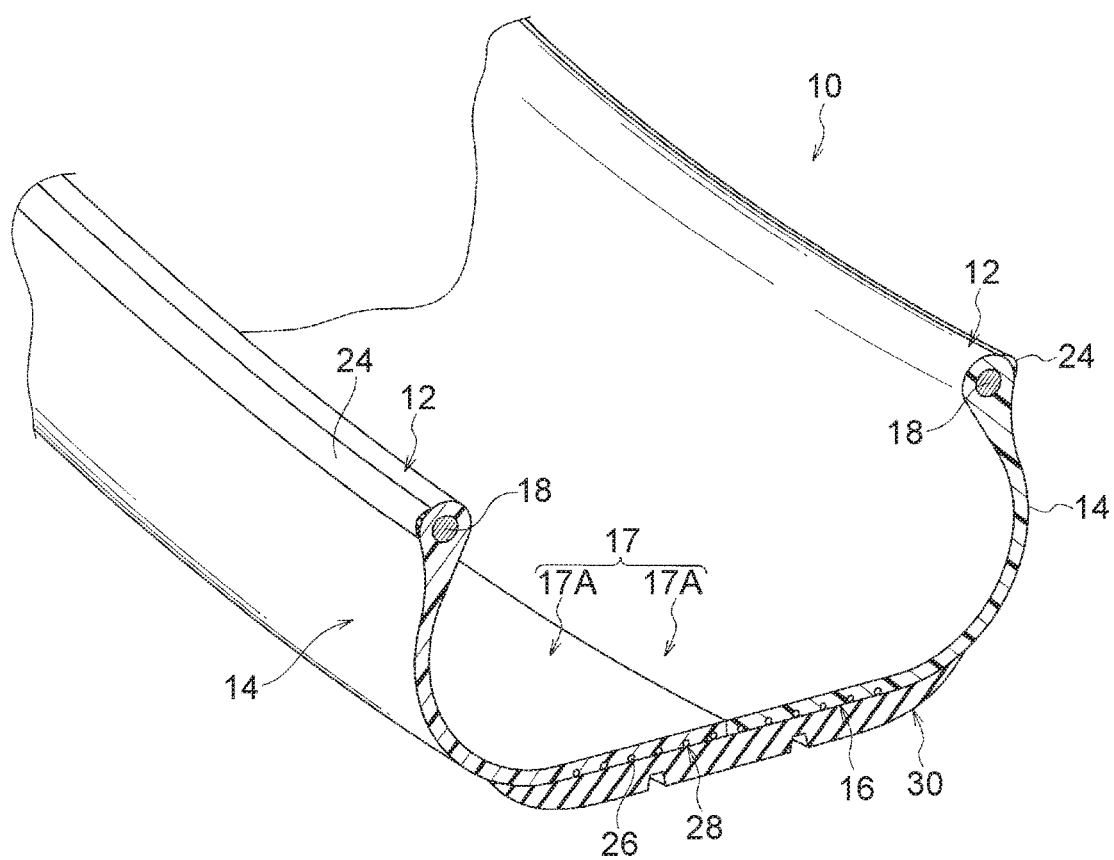
FIG. 1A is a perspective view illustrating a cross-section of a part of a tire according to one embodiment of the invention.

The tire according to the invention includes a resinous material (i.e., formed using at least a resinous material) and includes a circular tire frame. The resinous material includes a thermoplastic elastomer including a hard segment (HS) and a soft segment (SS), 55% or more of the molecular chain terminals of the thermoplastic elastomer being hard segments (HS).

The molecular chain terminals of a thermoplastic elastomer are explained below.

Each thermoplastic elastomer molecular chain has two terminals per molecule (linear molecular chain structure). Each terminal of a thermoplastic elastomer has either a hard segment (HS) or a soft segment (SS). In the thermoplastic elastomer according to the invention, 55% or more of the total number of the molecular chain terminals are hard segments (HS).

In the tire according to the invention, the thermoplastic elastomer included in the resinous material includes a hard segment and a soft segment, and, due to this configuration, the characteristics of these segments can be obtained. Tires produced using thermoplastic elastomers are desired to realize performance comparable to that of conventional rubber tires. However, it is not easy to compatibly achieve favorable tire characteristics with respect to both of the elastic modulus and the low-loss property.

In order to address this issue, the thermoplastic elastomer included in the resinous material in the tire according to the invention is made to have a structure in which 55% or more of the molecular chain terminals are hard segments (HS). HS moieties located at terminals have high molecular mobility and tendency to crystallize. Therefore, when the thermoplastic elastomer has a structure in which the percentage of HS at terminals is higher than the percentage of SS at terminals, HS moieties located at terminals of the thermoplastic elastomer tend to crystallize, and the increased crystallinity increases the elastic modulus due to hardening of the thermoplastic elastomer material, and also produces an effect in terms of reducing free terminals, thereby decreasing the loss.

Due to the above, both of a desirable elastic modulus and an excellent low-loss property are obtained.

<<Resinous Material>>
<Thermoplastic Elastomer>

The thermoplastic elastomer used as a resin material includes a hard segment (HS) and a soft segment (SS), and 55% or more of the molecular chain terminals are hard segments (HS).

The resin material may also include thermoplastic elastomers other than the above-specified thermoplastic elastomer, and freely-selected components. The scope of the term "resin" as used herein encompasses thermoplastic resins and thermosetting resins, but does not include natural rubbers.

The thermoplastic elastomer may include a connection portion between a hard segment (HS) and a soft segment (SS). The "connection portion" as used herein is a connection portion that connects two or more segments, namely, a connection portion between a hard segment and a soft segment. Examples of the connection portion include a connection portion formed using a chain extender, which will be described later.

When the thermoplastic elastomer includes a connection portion, i.e., when a chain extender is used, the content of the chain extender is preferably set such that the hydroxyl groups or amino groups of the monomer molecules serving as raw materials for soft segments are approximately equimolar to the carboxyl groups of the chain extender molecules.

—Hard Segment (HS) Percentage at Molecular Chain Terminals—

In the above-specified thermoplastic elastomer, the percentage of molecular chain terminals that are hard segments (HS) (which is obtained as the number of terminals that are hard segments (HS)/the total number of terminals×100, and is hereinafter also referred to simply as "terminal HS percentage") is 55% or higher. If the terminal HS percentage is lower than 55%, it is not possible to achieve both of a desirable elastic modulus and an excellent low-loss property.

The terminal HS percentage is more preferably 60% or higher, and still more preferably 70% or higher. A value closer to 100% is more preferable.

Method of Measuring Terminal HS Percentage

The percentage of molecular chain terminals that are hard segments (HS) (terminal HS percentage) can be determined by calculation from the percentage of molecular chain terminals that are soft segments (SS) (terminal SS percentage). More specifically, the terminal HS percentage can be calculated from a value obtained by dividing the number of reactive functional groups (for example, —OH, —NH$_2$, or —COOH) of soft segments remaining at terminals by the total number of terminals.

(i) When the Reactive Functional Groups of Soft Segments are "—OH"

First, the hydroxyl value [OH] (mg KOH/g) of hydroxyl groups (—OH) of soft segments remaining at terminals in 1 g of the thermoplastic elastomer is measured.

Measurement of the hydroxyl value [OH] (mg KOH/g) of terminal hydroxyl groups in 1 g of the thermoplastic elastomer can be carried out according to Japanese Industrial Standards (JIS) K1557-1. Specifically, about 1 g of a sample is precisely weighed (W (g)), and OH groups in the sample are first acetylated using acetic anhydride. A portion of the acetic acid that was not consumed by acetylation is titrated (A (ml)) with a 0.5 mol/l potassium hydroxide ethanol solution. Assuming that a result obtained by a blank test is B (ml), the hydroxyl value [OH] (mg KOH/g) is obtained according to the following equation:

$$[OH]=(A-B)\times F\times 28.05/W$$

In the equation, F represents the factor of the 0.5 mol/l ethanol solution of potassium hydroxide; and 28.05 is the value of the molecular weight of potassium hydroxide (KOH)×0.5.

The hydroxyl value [OH] (mg KOH/g) represents the number of milligrams (mg) of potassium hydroxide required for acetylating reactive functional groups of soft segments remaining at terminals in 1 g of the thermoplastic elastomer. Therefore, the hydroxyl value is divided by 1,000 and further divided by the molecular weight (56.1) of potassium hydroxide (KOH), and then multiplied by the Avogadro's constant $N_A$ (=6.02×10$^{23}$ (molecules/mol)), thereby providing the number of reactive functional groups of soft segments remaining at terminals per gram of the thermoplastic elastomer ([OH]/1000/56.1×$N_A$ (groups/g)).

In addition, the number average molecular weight Mn of the thermoplastic elastomer is measured by GPC (gel permeation chromatography; the measurement method will be described later). The number average molecular weight Mn is equal to the mass per mol (g/mol). Therefore, the number average molecular weight Mn is divided by the Avogadro's constant $N_A$ (=6.02×10$^{23}$ (molecules/mol)), to provide the mass per molecule of the thermoplastic elastomer (Mn/$N_A$ (g/molecule)). From the reciprocal of the mass per molecule (1/Mn×$N_A$), the number of molecules included in 1 g of the thermoplastic elastomer (molecules/g) is obtained. The obtained value is multiplied by the number of terminals (=2) present in one molecule of the thermoplastic elastomer, thereby obtaining the total number of terminals included in 1 g of the thermoplastic elastomer (1/Mn×$N_{A\times 2}$ (terminals/g)).

Next, the terminal SS percentage is obtained according to an equation in which the number of reactive functional groups in soft segments remaining at terminals per gram of the thermoplastic elastomer ([OH]/1000/56.1×$N_A$ (groups/g)) is divided by the total number of terminals included in 1 g of the thermoplastic elastomer (1/Mn×$N_A$×2 (terminals/g)), and further multiplied by 100 (=[OH]/1000/56.1×$N_A$/1×Mn/$N_A$/2×100); that is, the terminal SS percentage is obtained according to the following equation:

Terminal SS percentage (%)=[OH]/1000/56.1×Mn/2×100

Furthermore, the percentage of molecular chain terminals that are hard segments (HS) (terminal HS percentage) can be obtained according to an equation in which the terminal SS percentage is subtracted from 100, i.e., according to the following equation:

Terminal HS percentage (%)=100−[OH]/1000/56.1×Mn/2×100

In the equation, [OH] represents the hydroxyl value [OH] (mg KOH/g) of the thermoplastic elastomer, and Mn represents the number average molecular weight of the thermoplastic elastomer.

(ii) When the Reactive Functional Groups of Soft Segments are "—NH$_2$"

First, the gram equivalent [NH$_2$] (geq/g) of terminal amino groups in 1 g of a thermoplastic elastomer is calculated.

Measurement of the gram equivalent [NH$_2$] (geq/g) of terminal amino groups can be carried out as follows. About 1 g of a sample is precisely weighed (W (g)), and the sample is dissolved in 35 ml of phenol, and 2 ml of methanol is added thereto, to form a sample solution. Titration (X (ml)) is performed with a 0.01N HCl aqueous solution, using Thymol Blue as an indicator. Assuming that a result obtained by a blank test is a (ml), the gram equivalent [NH$_2$] (geq/g) of terminal amino groups is obtained according to the following equation:

[NH$_2$]=(X−a)/W×0.01

The gram equivalent [NH$_2$] (geq/g) is equal to the mole number of reactive functional groups (mol/g) of soft segments remaining at terminals in 1 g of the thermoplastic elastomer. Therefore, the gram equivalent [NH$_2$] is multiplied by the Avogadro's constant $N_A$ (=6.02×10$^{23}$ (molecules/mol)), thereby providing the number of reactive functional groups in soft segments remaining at terminals per gram of the thermoplastic elastomer ([NH$_2$]×$N_A$(groups/g)).

In addition, the number average molecular weight Mn of the thermoplastic elastomer is measured by GPC (gel permeation chromatography; measurement method will be described later). The number average molecular weight Mn is equal to the mass per mol (g/mol). Therefore, the number average molecular weight is divided by the Avogadro's constant $N_A$ ($6.02 \times 10^{23}$ (molecules/mol)), to provide the mass per molecule of the thermoplastic elastomer (Mn/$N_A$ (g/molecule)). From the reciprocal of the mass per molecule ($1/\text{Mn} \times N_A$), the number of molecules included in 1 g of the thermoplastic elastomer (molecules/g) is obtained. The obtained value is multiplied by the number of terminals (=2) present in one molecule of the thermoplastic elastomer, thereby obtaining the total number of terminals included in 1 g of the thermoplastic elastomer ($1/\text{Mn} \times N_A \times 2$ (terminals/g)).

Next, the terminal SS percentage is obtained according to an equation in which the number of reactive functional groups in soft segments remaining at terminals per gram of the thermoplastic elastomer ($[NH_2] \times N_A$ (groups/g)) is divided by the total number of terminals included in 1 g of the thermoplastic elastomer ($1/\text{Mn} \times N_A \times 2$ (terminals/g)), and further multiplied by 100 ($=[NH_2] \times N_A/1 \times \text{Mn}/N_A/2 \times 100$); that is, the terminal SS percentage is obtained according to the following equation:

Terminal SS percentage (%)=$[NH_2] \times \text{Mn}/2 \times 100$

Furthermore, the percentage of molecular chain terminals that are hard segments (HS) (terminal HS percentage) can be obtained according to an equation in which the terminal SS percentage is subtracted from 100, i.e., according to the following equation:

Terminal HS percentage (%)=$100-[NH_2] \times \text{Mn}/2 \times 100$

In the equation, $[NH_2]$ represents the gram equivalent (geq/g) of terminal amino groups in 1 g of the thermoplastic elastomer; and Mn represents the number average molecular weight of the thermoplastic elastomer.

(iii) When the Reactive Functional Groups of Soft Segments are "—COOH"

The gram equivalent of terminal carboxyl groups can be calculated according to the same equation as that in '(ii) When the reactive functional groups of soft segments are "—$NH_2$"', except that the gram equivalent $[NH_2]$ (geq/g) of terminal amino groups in 1 g of the thermoplastic elastomer is replaced by the gram equivalent [COOH] (geq/g) of terminal carboxyl groups.

Measurement of the gram equivalent of terminal carboxyl groups [COOH] (geq/g) can be carried out as follows. About 1 g of a sample is precisely weighed (W (g)), and the sample is dissolved under heating in 35 ml of o-cresol. After the solution is cooled, 20 ml of benzyl alcohol and 250 µl of formaldehyde are added to the solution, to form a sample solution. Potentiometric titration (X (ml) is performed with a KOH methanol solution (concentration: 0.1N). Assuming that a result obtained by a blank test is a (ml), the gram equivalent [COOH] (geq/g) of terminal carboxyl groups is obtained according to the following equation:

[COOH]=$(X-a)/W \times 0.1$

When the reactive functional groups of soft segments are other than those described above, the terminal HS percentage can be obtained by calculating the gram equivalent (geq/g) of terminal reactive functional groups in 1 g of the thermoplastic elastomer.

Method of Controlling Terminal HS Percentage

Methods usable for adjusting the percentage of molecular chain terminals that are hard segments (HS) (terminal HS percentage) to be within the above-described range are not particularly limited, and examples thereof include the following two methods.

Scheme 1: A method includes first measuring the terminal HS percentage after polymerization for a thermoplastic elastomer, additionally adding hard segments necessary for achieving a desired terminal HS percentage, and allowing the added hared segments to react with the thermoplastic elastomer to adjust the terminal HS percentage to be within the above-described range. The hard segments to be additionally added afterwards may be added at once, or added in portions two or more times. The terminal HS percentage can be adjusted by adjusting the addition amount.

Scheme 2: In a method, a material having only one reactive functional group (hard segment having modification at one terminal) is used as a material for hard segments (HS) used for polymerization for a thermoplastic elastomer. Specifically, the method includes adjusting the addition amount of the hard segment having modification at one terminal, to adjust the terminal HS percentage to be within the above-described range. The method may include adding a material for the hard segment that includes only the hard segment having modification at one terminal, or include adding a material for the hard segment that includes the hard segment having modification at one terminal as well as a material having two reactive functional groups (hard segment having modifications at both terminals). A higher proportion of the hard segment having modification at one terminal results in a higher terminal HS percentage.

—Amount of Terminal Reactive Functional Groups Derived from Soft Segment (SS)—

The amount (mmol/kg) of reactive functional groups (for example, —OH, —$NH_2$, or —COOH) of soft segments remaining at terminals in 1 kg of the thermoplastic elastomer is preferably 10 mmol/kg or less, more preferably 8 mmol/kg or less, and still more preferably 5 mmol/kg or less; an amount closer to 0 mmol/kg is more preferable.

When the amount of terminal reactive functional groups from SS is 10 mmol/kg or less, an increase in the loss caused by high mobility of terminals of SS can be reduced.

The amount of terminal reactive functional groups from SS can be measured based on the above-described methods for measuring the hydroxyl value or gram equivalent of reactive functional group (such as —OH, —$NH_2$ or —COOH) of soft segments remaining at terminals.

—Molecular Weight—

The number average molecular weight of the thermoplastic elastomer is, for example, from 15,700 to 200,000. When the number average molecular weight is 15,700 or more, excellent fittability to a rim can be obtained. When the number average molecular weight is 200,000 or less, the melt viscosity does not become too high, as a result of which occurrence of insufficient filling is reduced at the time of forming a tire frame, and a low molding temperature and a low temperature for the mold can be employed. Therefore, the cycle time is shortened, and an excellent productivity is obtained.

The number average molecular weight of the thermoplastic elastomer is more preferably from 20,000 to 160,000.

The number average molecular weight of the thermoplastic elastomer can be measured by gel permeation chromatography (GPC). For example, GPC (gel permeation chromatography), such as a HLC-8320GPC EcoSEC manufactured by Tosoh Corporation, may be used.

The content of hard segments in the thermoplastic elastomer is preferably from 5% to 95% by mass, more preferably from 10% to 90% by mass, and particularly preferably from 15% to 90% by mass, with respect to the total amount of the thermoplastic elastomer.

The content of soft segments in the thermoplastic elastomer is preferably from 10% to 95% by mass, and more preferably from 10% to 90% by mass, with respect to the total amount of the thermoplastic elastomer.

When the chain extender is used, the content of the chain extender is preferably set such that terminal functional groups (for example, hydroxyl groups or amino groups) of polymer molecules for forming soft segments are approximately equimolar to carboxyl groups of the chain extender molecules.

—HS/SS Ratio—

From the viewpoint of obtaining excellent rigidity for the tire and from the viewpoint of excellent fittability to a rim, the mass ratio (HS/SS) of hard segments (HS) to soft segments (SS) in the thermoplastic elastomer is preferably in the range of from 30/70 to 80/20. The mass ratio is more preferably in the range of from 50/50 to 75/25.

Examples of thermoplastic elastomers that may be used in the invention include polyamide-based thermoplastic elastomers (Thermoplastic Amid Elastomers, TPAs), polyolefin-based thermoplastic elastomers (Thermoplastic PolyOlefins, TPOs), polystyrene-based thermoplastic elastomers (Styrenic Thermoplastic Elastomers, TPSs), polyurethane-based thermoplastic elastomers (Thermoplastic Polyurethanes, TPUs), thermoplastic rubber crosslinked products (Thermo-Plastic Vulcanizates, TPVs), and other thermoplastic elastomers (Thermoplastic elastomers other, TPZs), as defined in JIS K6418:2007.

Among these, polyurethane-based thermoplastic elastomers (TPUs) and polyamide-based thermoplastic elastomers (TPAs) are preferable, considering that the properties of these elastomers, having connection portions formed by polyaddition reactions, can be modified simply by changing, for example, the structures of the connection portions, and that techniques therefor have been established.

Of polyurethane-based thermoplastic elastomers (TPUs) and polyamide-based thermoplastic elastomers (TPAs), polyamide-based thermoplastic elastomers (TPAs) are more preferred due to their high resistance to hydrolysis.

In the following description, polyamide-based thermoplastic elastomers (TPAs) and polyurethane-based thermoplastic elastomers (TPUs), which are preferable thermoplastic elastomers in the invention, are described.

(Polyamide-Based Thermoplastic Elastomer)

The term "polyamide-based thermoplastic elastomer" as used in the invention refers to a thermoplastic elastomer that is a copolymer including a polymer for forming a part or the whole of a hard segment and a polymer for forming a part or the whole of a soft segment, the hard segment being crystalline and having a high melting point, the soft segment being amorphous and having a low glass transition temperature, and the main chain of the polymer for forming a part or the whole of a hard segment including an amide bond (—CONH—).

The polyamide-based thermoplastic elastomer may be a material in which at least a polyamide forms a part or the whole (preferably, the whole) of a hard segment, which is crystalline and has a high melting point, and another polymer (for example, a polyester or a polyether) forms a part or the whole (preferably, the whole) of a soft segment, which is amorphous and has a low glass transition temperature.

—Hard Segment—

The polyamide for forming a part or the whole of a hard segment is, for example, a polyamide synthesized using a monomer represented by the following Formula (1) or Formula (2).

When a material having only one reactive functional group (hard segment having modification at one terminal) is to be used as a material for a hard segment, a polyamide synthesized using a monomer (hereinafter, referred to as a "terminator") acting to terminate polymerization and to make one of the terminals free of remaining reactive functional groups may be used.

$$H_2N—R^1—COOH \qquad \text{Formula (1)}$$

In Formula (1), $R^1$ represents a hydrocarbon molecular chain having from 2 to 20 carbon atoms (for example, an alkylene group having from 2 to 20 carbon atoms).

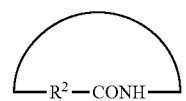

Formula (2)

In Formula (2), $R^2$ represents a hydrocarbon molecular chain having from 3 to 20 carbon atoms (for example, an alkylene group having from 3 to 20 carbon atoms).

In Formula (1), $R^1$ is preferably a hydrocarbon molecular chain having from 3 to 18 carbon atoms (for example, an alkylene group having from 3 to 18 carbon atoms), more preferably a hydrocarbon molecular chain having from 4 to 15 carbon atoms (for example, an alkylene group having from 4 to 15 carbon atoms), and particularly preferably a hydrocarbon molecular chain having from 10 to 15 carbon atoms (for example, an alkylene group having from 10 to 15 carbon atoms). In Formula (2), $R^2$ is preferably a hydrocarbon molecular chain having from 3 to 18 carbon atoms (for example, an alkylene group having from 3 to 18 carbon atoms), more preferably a hydrocarbon molecular chain having from 4 to 15 carbon atoms (for example, an alkylene group having from 4 to 15 carbon atoms), and particularly preferably a hydrocarbon molecular chain having from 10 to 15 carbon atoms (for example, an alkylene group having from 10 to 15 carbon atoms).

Examples of monomers represented by the above Formula (1) or Formula (2) include an ω-aminocarboxylic acid and a lactam. Examples of the polyamide for forming a part or the whole of a hard segment include a polycondensate of an ω-aminocarboxylic acid, a polycondensate of a lactam, and a co-polycondensate of a diamine and a dicarboxylic acid.

Examples of the ω-aminocarboxylic acid include aliphatic ω-aminocarboxylic acids having from 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Examples of the lactam include aliphatic lactams having from 5 to 20 carbon atoms, such as lauryllactam, ε-caprolactam, undecanelactam, ω-enantholactam, and 2-pyrrolidone.

Examples of the diamine include diamine compounds such as aliphatic diamines having from 2 to 20 carbon atoms, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine and metaxylenediamine. The dicarboxylic acid may be represented by HOOC—$(R^3)_m$—COOH, wherein $R^3$ represents a hydrocarbon molecular chain having from 3 to 20 carbon atoms, and m represents 0 or 1. Examples of the dicarboxylic acid include aliphatic dicarboxylic acids having from 2 to 22 carbon atoms, such as oxalic acid, succinic acid, glutaric acid, adipic acid, pimelic acid, suberic acid, azelaic acid, sebacic acid, and dodecanedioic acid.

Examples of the terminator include monomers having a structure of $R^4$—COOH (wherein $R^4$ represents a hydrocarbon molecular chain having from 2 to 20 carbon atoms, an alkylene group having from 2 to 20 carbon atoms, or a functional group having a cyclic structure having from 3 to 20 carbon atoms).

Specific examples of the terminator include saturated fatty acids such as dodecanoic acid, caproic acid, lauric acid, and stearic acid, and unsaturated fatty acids such as linoleic acid and oleic acid.

When the terminator is together polymerized, the terminator acts to terminate polymerization and to make one of the terminals free of remaining reactive functional groups, whereby a polyamide having modification at only one of the terminal thereof is obtained.

Examples of the polyamide for forming a part or the whole of the hard segment include a polyamide obtained by ring-opening polycondensation of ε-caprolactam (polyamide 6), a polyamide obtained by ring-opening polycondensation of undecane lactam (polyamide 11), a polyamide obtained by ring-opening polycondensation of lauryl lactam (polyamide 12), a polyamide obtained by polycondensation of 12-aminododecanoic acid (polyamide 12), a polycondensate polyamide of a diamine and a dibasic acid (polyamide 66), and a polyamide having meta-xylenediamine as a constituent unit (amide MX).

Polyamide 6 can be expressed by, for example, {CO—$(CH_2)_5$—NH}$_n$, wherein n represents the number of repeating units, which may be freely set. Here, n is preferably from 2 to 100, and more preferably from 3 to 50.

Polyamide 11 can be expressed by, for example, {CO—$(CH_2)_{10}$—NH}$_n$, wherein n represents the number of repeating units, which may be freely set. Here, n is preferably from 2 to 100, and more preferably from 3 to 50.

Polyamide 12 can be expressed by, for example, {CO—$(CH_2)_{11}$—NH}$_n$, wherein n represents the number of repeating units, which may be freely set. Here, n is preferably from 2 to 100, and more preferably from 3 to 50.

Polyamide 66 can be expressed by, for example, {CO $(CH_2)_4$CONH$(CH_2)_6$NH}$_n$, wherein n represents the number of repeating units, which may be freely set. Here, n is preferably from 2 to 100, and more preferably from 3 to 50.

The amide MX having meta-xylenediamine as a constituent unit may be represented by, for example, the following structure unit (A-1), wherein n represents the number of repeating units, which may be freely set; for example, n is preferably from 2 to 100, and more preferably from 3 to 50.

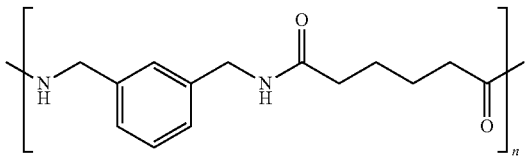

(A-1)

The polyamide-based thermoplastic elastomer preferably includes, as a hard segment, a polyamide including a unit structure represented by —[CO—$(CH_2)_{11}$—NH]— (polyamide 12). As described above, polyamide 12 can be obtained by ring-opening polycondensation of lauryl lactam, or polycondensation of 12-aminododecanoic acid.

—Soft Segment—

Examples of the polymer for forming a part or the whole of the soft segment include polyesters and polyethers. Further examples include polyethylene glycol, polypropylene glycol, polytetramethylene ether glycol (PTMG), and ABA-type triblock polyethers. These may be used singly, or in combination of two or more thereof. A polyetherdiamine obtained by allowing, for example, ammonia to react with a terminal of a polyether is also usable; for example, ABA-type triblock polyetherdiamines may be used.

Here, the "ABA-type triblock polyether" refers to a polyether represented by the following Formula (3).

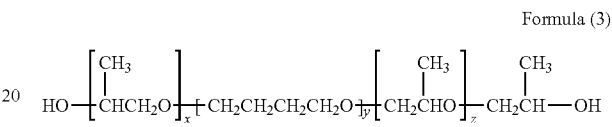

Formula (3)

In Formula (3), each of x and z independently represents an integer from 1 to 20, and y represents an integer from 4 to 50.

In Formula (3), each of x and z is preferably an integer from 1 to 18, more preferably an integer from 1 to 16, particularly preferably an integer from 1 to 14, and most preferably an integer from 1 to 12. In Formula (3), y is preferably an integer from 5 to 45, more preferably an integer from 6 to 40, particularly preferably an integer from 7 to 35, and most preferably an integer from 8 to 30.

The ABA-type triblock polyether diamine is, for example, a polyether diamine represented by the following Formula (N).

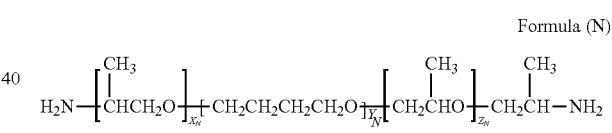

Formula (N)

In Formula (N), each of $X_N$ and $Z_N$ independently represents an integer from 1 to 20, and $Y_N$ represents an integer from 4 to 50.

In Formula (N), each of $X_N$ and $Z_N$ is preferably an integer from 1 to 18, more preferably an integer from 1 to 16, particularly preferably an integer from 1 to 14, and most preferably an integer from 1 to 12. In Formula (N), $Y_N$ is preferably an integer from 5 to 45, more preferably an integer from 6 to 40, particularly preferably an integer from 7 to 35, and most preferably an integer from 8 to 30.

The combination of a hard segment and a soft segment is, for example, a combination of any of the above examples of a hard segment and any of the above examples of a soft segment. Among them, a combination of a ring-opening polycondensate of lauryl lactam and polyethylene glycol; a combination of a ring-opening polycondensate of lauryl lactam and polypropylene glycol; a combination of a ring-opening polycondensate of lauryl lactam and polytetramethylene ether glycol; a combination of a ring-opening polycondensate of lauryl lactam and ABA-type triblock polyether; a combination of a ring-opening polycondensate of lauryl lactam and ABA-type triblock polyetherdiamine; a combination of a polycondensate of aminododecanoic acid and polyethylene glycol; a combination of a polycondensate of aminododecanoic acid and polypropylene glycol; a combination of a polycondensate of aminododecanoic acid and polytetramethylene ether glycol; a combination of a polycondensate of aminododecanoic acid and ABA-type triblock polyether; or a combination of a polycondensate of aminododecanoic acid and ABA-type triblock polyetherdiamine is preferred. Furthermore, a combination of a ring-opening polycondensate of lauryl lactam and ABA-type triblock polyether; a combination of a ring-opening polycondensate of lauryl lactam and ABA-type triblock polyetherdiamine; a combination of a polycondensate of aminododecanoic acid and ABA-type triblock polyether; or a combination of a polycondensate of aminododecanoic acid and ABA-type triblock polyetherdiamine is particularly preferred.

The polymer for forming a part or the whole of a soft segment may include, as a monomer unit, a diamine such as a branched saturated diamine having from 6 to 22 carbon atoms, a branched alicyclic diamine having from 6 to 16 carbon atoms or a norbornane diamine. The branched saturated diamine having from 6 to 22 carbon atoms, the branched alicyclic diamine having from 6 to 16 carbon atoms and the norbornane diamine may be used singly, or in combination of two or more thereof. These diamines may be used in combination with an ABA-type triblock polyether or an ABA-type triblock polyetherdiamine, which are detailed above.

Examples of the branched saturated diamine having from 6 to 22 carbon atoms include 2,2,4-trimethyl-1,6-hexanediamine, 2,4,4-trimethyl-1,6-hexanediamine, 1,2-diaminopropane, 1,3-diaminopentane, 2-methyl-1,5-diaminopentane and 2-methyl-1,8-diaminooctane.

Examples of the branched alicyclic diamine having from 6 to 16 carbon atoms include 5-amino-2,2,4-trimethyl-1-cyclopentane methyl amine and 5-amino-1,3,3-trimethylcyclohexane methyl amine. Each of these diamines may be in the cis-form or the trans-form, or a mixture of these isomers.

Examples of the norbornane diamine include 2,5-norbomane dimethyl amine, 2,6-norbomane dimethyl amine, or a mixture thereof.

The polymer for forming a part or the whole of a soft segment may include other diamine compounds than those described above, as monomer units. Examples of other diamine compounds include an aliphatic diamine such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, or 3-methylpentamethylene diamine, an alicyclic diamine such as bis(4-aminocyclohexyl)methane, bis(4-aminocyclohexyl)propane, 1,3-bisaminomethylcyclohexane or 1,4-bisaminomethylcyclohexane, or an aromatic diamine such as metaxylylenediamine or paraxylylenediamine.

These diamines may be used singly, or in combination of two or more thereof, as appropriate.

—Connection Portion—

As described above, the connection portion of the polyamide-based thermoplastic elastomer is, for example, a moiety at which connection is made by a chain extender.

Examples of the chain extender include dicarboxylic acids, diols, and diisocyanate. As the dicarboxylic acid, for example, at least one selected from the group consisting of an aliphatic dicarboxylic acid, an alicyclic dicarboxylic acid and an aromatic dicarboxylic acid, or a derivative thereof, may be used. Examples of the diol include aliphatic diols, alicyclic diols, and aromatic diols. Examples of the diisocyanate that may be used include aromatic diisocyanates, aliphatic diisocyanates, and alicyclic diisocyanates, and any mixtures thereof.

Specific examples of the dicarboxylic acids include: aliphatic dicarboxylic acids including a linear aliphatic dicarboxylic acid having from 2 to 25 carbon atoms, such as adipic acid, decane dicarboxylic acid, oxalic acid, succinic acid, glutaric acid, pimelic acid, suberic acid, azelaic acid, sebacic acid, or dodecanedioic acid; a dimerized aliphatic dicarboxylic acid having from 14 to 48 carbon atoms that is a dimerized unsaturated fatty acid obtained by fractional distillation of a triglyceride, and hydrogenated products of these dicarboxylic acids; alicyclic dicarboxylic acids such as 1,4-cyclohexane dicarboxylic acid; and aromatic dicarboxylic acids such as terephthalic acid and isophthalic acid. Among these, dodecanedioic acid, eicosanedioic acid, phenyldiacetic acid, terephthalic acid, and adipic acid are preferable.

Specific examples of the diisocyanates include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylene diisocyanate, isophorone diisocyanate, 4,4'-dicyclohexylmethane diisocyanate, methylcyclohexane diisocyanate, tetramethylxylylene diisocyanate, 2,6-diisopropylphenyl isocyanate, and 1,3,5-triisopropylbenzene-2,4-diisocyanate. Among these, aromatic diisocyanates are preferable, and 4,4'-diphenylmethane diisocyanate is more preferable.

Specific examples of the diols include ethylene glycol, diethylene glycol, triethylene glycol, propylene glycol, butanediol, hexanediol, neopentyl glycol, cyclohexanediol, cyclohexanedimethanol, hydrogenated bisphenol A, ethylene oxide adducts of bisphenol A, and propylene oxide adducts of bisphenol A. Among these, aliphatic diols are preferable, and butanediol is more preferable.

—Synthesis Method—

The polyamide-based thermoplastic elastomer can be synthesized by copolymerizing a polymer for forming a part or the whole of a hard segment and a polymer for forming a part or the whole of a soft segment, using known methods. For example, the polyamide-based thermoplastic elastomer may be obtained by polymerizing, in a container, a monomer serving as a raw material for forming a hard segment (for example, an ω-aminocarboxylic acid such as 12-aminododecanoic acid, or a lactam such as lauryl lactam, and, if a material having only one reactive functional group (hard segment having modification at one terminal) is to be polymerized, the terminator described above), a monomer serving as a raw material for forming a soft segment (for example, an ABA-type triblock polyether or an ABA-type triblock polyetherdiamine, which are detailed above), and, if necessary, a chain extender (for example, adipic acid or decanedicarboxylic acid). In particular, when an ω-aminocarboxylic acid is used as a monomer serving as a raw material for forming a hard segment, the polyamide-based thermoplastic elastomer may be synthesized by performing normal pressure melt polymerization, or by performing normal pressure melt polymerization and further performing reduced pressure melt polymerization. When a lactam is used as a monomer serving as a raw material for forming a hard segment, an appropriate amount of water may also be present, and the polyamide-based thermoplastic elastomer may be produced by a method including melt polymerization under an pressure elevation of from 0.1 to 5 MPa, and subsequent normal pressure melt polymerization and/or reduced pressure melt polymerization. These synthesis reactions may be carried out in either a batch manner or a continuous manner. In order to perform the synthesis reaction, a batch reaction tank, a mono-tank or multi-tank continuous reaction apparatus, a tubular continuous reaction apparatus, and the like may be used singly or in an appropriate combination of two or more thereof.

In the production of the polyamide-based thermoplastic elastomer, the polymerization temperature is preferably from 150° C. to 300° C., and more preferably from 160° C. to 280° C. The polymerization time may appropriately be set in relation to the number average molecular weight of the polyamide-based thermoplastic elastomer to be synthesized, and the polymerization temperature. For example, the polymerization time is preferably from 0.5 to 30 hours, and more preferably from 0.5 to 20 hours.

In the production of the polyamide-based thermoplastic elastomer, additives may be added, as necessary, in order to adjust the molecular weight or stabilize the melt viscosity at the time of shaping, and examples of additives include monoamins or diamines such as laurylamine, stearylamine, hexamethylenediamine, and metaxylylenediamine, and monocarboxylic acids or dicarboxylic acids such as acetic acid, benzoic acid, stearic acid, adipic acid, sebacic acid and dodecanedioic acid. Additives may be selected, as appropriate, in consideration of the molecular weight and viscosity of the polyamide-based thermoplastic elastomer to be obtained, provided that the additives should not adversely affect the effect according to the invention.

In the production of the polyamide-based thermoplastic elastomer, catalysts may be used, as necessary. The catalyst is, for example, a compound containing at least one selected from the group consisting of P, Ti, Ge, Zn, Fe, Sn, Mn, Co, Zr, V, Ir, La, Ce, Li, Ca and Hf.

For example, examples include inorganic phosphorus compounds, organic titanium compounds, organic zirconium compounds and organic tin compounds.

Specifically, examples of inorganic phosphorus compounds include: phosphorus-containing acids such as phosphoric acid, pyrophosphoric acid, polyphosphoric acid, phosphorous acid and hypophosphorous acid; alkali metal salts of phosphorus-containing acids; or alkaline earth metal salts of phosphorus-containing acids.

Examples or organic titanium compounds include titanium alkoxides (such as titanium tetrabutoxide or titanium tetraisopropoxide).

Examples of organic zirconium compounds include zirconium alkoxides (such as zirconium tetrabutoxide (also indicated as "Zr(OBu)$_4$" or "Zr(OC$_4$H$_9$)$_4$")).

Examples of organic tin compounds include distannoxane compounds (such as 1-hydroxy-3-isothiocyanate-1,1,3,3-tetrabutyldistannoxane), tin acetate, dibutyltin dilaurate, or butyltin hydroxide oxide hydrate.

The amount of the catalyst to be added and the timing of addition of the catalyst are not particularly limited as long as the desired product can be obtained quickly.

(Polyurethane-based Thermoplastic Elastomer)

The polyurethane-based thermoplastic elastomer is, for example, a material in which at least a polyurethane forms a part or the whole of a hard segment forming pseudo-crosslinking by physical aggregation, and in which another polymer forms a part or the whole of a soft segment having amorphous property and a low glass transition temperature. For example, the polyurethane-based thermoplastic elastomer is, for example, a copolymer that includes a soft segment including a unit structure represented by the following Formula A and a hard segment including a unit structure represented by the following Formula B.

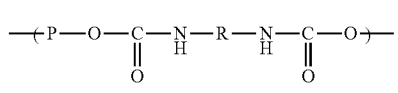

Formula A

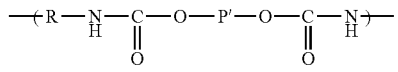

Formula B

—Soft Segment—

In Formula A, P represents a long-chain aliphatic polyether or a long-chain aliphatic polyester. In Formula A or Formula B, R represents an aliphatic hydrocarbon, an alicyclic hydrocarbon, or an aromatic hydrocarbon. In Formula B, P' represents a short-chain aliphatic hydrocarbon, an alicyclic hydrocarbon, or an aromatic hydrocarbon.

In Formula A, the long-chain aliphatic polyether or long-chain aliphatic polyester represented by P may have a molecular weight of, for example, from 500 to 5,000. P is formed using a diol compound containing the long-chain aliphatic polyether or long-chain aliphatic polyester represented by P. Examples of such a diol compound include polyethylene glycol, polypropylene glycol, polytetramethylene ether glycol, poly(butylene adipate) diol, poly(s-caprolactone) diol, poly(hexamethylene carbonate) diol, and an ABA-type triblock polyether (detailed above) that have a molecular weight in the above-specified range.

These may be used singly, or in combination of two or more thereof.

In Formula A, R is formed using a diisocyanate compound containing the aliphatic hydrocarbon, alicyclic hydrocarbon or aromatic hydrocarbon represented by R. Examples of the aliphatic diisocyanate compound containing the aliphatic hydrocarbon represented by R include 1,2-ethylene diisocyanate, 1,3-propylene diisocyanate, 1,4-butane diisocyanate, and 1,6-hexamethylene diisocyanate.

Examples of the diisocyanate compound containing the alicyclic hydrocarbon represented by R include 1,4-cyclohexane diisocyanate and 4,4-cyclohexane diisocyanate. Furthermore, examples of the aromatic diisocyanate compound containing the aromatic hydrocarbon represented by R include 4,4'-diphenylmethane diisocyanate and tolylene diisocyanate.

These may be used singly or in combination of two or more thereof.

—Hard Segment—

In Formula B, the short-chain aliphatic hydrocarbon, alicyclic hydrocarbon or aromatic hydrocarbon represented by P' has a molecular weight of, for example, less than 500. P' is formed using a diol compound containing the short-chain aliphatic hydrocarbon, alicyclic hydrocarbon or aromatic hydrocarbon represented by P'. Examples of the aliphatic diol compound containing the short-chain aliphatic hydrocarbon represented by P' include glycols and polyalkylene glycols. Examples thereof include ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol, and 1,10-decanediol.

Furthermore, examples of the alicyclic diol compound containing the alicyclic hydrocarbon represented by P' include cyclopentane-1,2-diol, cyclohexane-1,2-diol, cyclohexane-1,3-diol, cyclohexane-1,4-diol, and cyclohexane-1,4-dimethanol.

Examples of the aromatic diol compound containing the aromatic hydrocarbon represented by P' include hydroquinone, resorcin, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenyl sulfide, 4,4'-dihydroxydiphenylsulfone, 4,4'-dihydroxybenzophenone, 4,4'-dihydroxydiphenylmethane, bisphenol A, 1,1-di(4-hydroxyphenyl)cyclohexane, 1,2-bis(4-hydroxyphenoxy)ethane, 1,4-dihydroxynaphthalene, and 2,6-dihydroxynaphthalene.

These may be used singly or in combination of two or more thereof. The explanation of R in Formula B is the same as that of R in Formula A.

—Connection Portion—

The connection portion may be a part at which connection occurs via, for example, a chain extender. Examples of the chain extender include the above chain extender examples listed in the explanation of the polyamide-based thermoplastic elastomer. Among these, the chain extender for the polyurethane-based thermoplastic elastomer is preferably dodecanedioic acid, eicosanedioic acid, phenyldiacetic acid, terephthalic acid, or adipic acid.

The polyurethane-based thermoplastic elastomer may be synthesized by copolymerizing a polymer for forming a part or the whole of a hard segment and a polymer for forming a part or the whole of a soft segment, using known methods.

The resinous material may include various additives, as desired, such as rubber, various fillers (for example, silica, calcium carbonate, and clay), anti-aging agents, oils, plasticizers, colorants, weather resistance agents and reinforcing agents. The contents of the additives in the resinous material (tire frame) are not particularly limited, and the additives may be used, as appropriate, in a range in which the effect according to the invention is not impaired. When non-resinous components, such as additives, are added to the resinous material, the content of resin component in the resinous material is preferably 50% by mass or more, and more preferably 90% by mass or more, with respect to the total amount of the resinous material. The content of resin component in the resinous material is the balance remaining after subtracting the total content of the various additives from the total amount of the resin components.

<Physical Properties of Resinous Material>

Next, preferable physical properties of the resinous material forming a part or the whole of the tire frame will be described. The tire frame according to the invention is formed using the resinous material.

The melting point (or softening point) of the resinous material (tire frame) is ordinarily from 100° C. to 350° C., and preferably approximately from 100° C. to 250° C. From the viewpoint of tire productivity, the melting point (softening point) is preferably approximately from 120° C. to 250° C., and more preferably from 120° C. to 200° C.

When, for example, a tire frame is formed by fusing divided parts (frame pieces) of the tire frame, use of a resinous material having a melting point of 120° C. to 250° C. provides a sufficient adhesive strength between tire frame pieces in a frame formed by fusing at a surrounding temperature of 120° C. to 250° C. Therefore, the tire according to the invention has excellent durability at running, such as puncture resistance or wear resistance. The heating temperature described above is preferably a temperature that is 10° C. to 150° C. higher than the melting point (or softening point) of the resinous material forming a part or the whole of the tire frame, and more preferably a temperature that is 10° C. to 100° C. higher than the melting point (or softening point) of the resinous material forming a part or the whole of the tire frame.

The resinous material can be obtained by adding various additives, if necessary, and appropriately mixing the ingredients using a known method (for example, melt mixing). The resinous material obtained by melt mixing may be shaped into pellets, if necessary, and used.

The tensile strength at yield as defined in Japanese Industrial Standards (JIS) K7113:1995 of the resinous material (tire frame) itself is preferably 5 MPa or more, more preferably from 5 MPa to 20 MPa, and still more preferably from 5 MPa to 17 MPa. When the tensile strength at yield of the resinous material is 5 MPa or more, the resinous material can endure deformation due to a load applied to the tire, for example, at running.

The tensile elongation at yield as defined in JIS K7113:1995 of the resinous material (tire frame) itself is preferably 10% or more, more preferably from 10% to 70%, and still more preferably from 15% to 60%. When the tensile elongation at yield of the resinous material is 10% or more, the elastic range is large, and air seal property can be improved.

The tensile elongation at break as defined in JIS K7113:1995 of the resinous material (tire frame) itself is preferably 50% or more, preferably 100% or more, still more preferably 150% or more, and particularly preferably 200% or more. When the tensile elongation at break of the resinous material is 50% or more, fittability to a rim is excellent, and the tire is resistant to breakage upon impact.

The deflection temperature under load as defined in ISO75-2 or ASTM D648 of the resinous material (tire frame) itself (under a load of 0.45 MPa) is preferably 50° C. or higher, preferably from 50° C. to 150° C., and more preferably from 50° C. to 130° C. When the deflection temperature under load of the resinous material is 50° C. or higher, deformation of the tire frame can be reduced even when vulcanization is performed in tire production.

First Embodiment

A tire according to a first embodiment of the tire according to the invention is described below with reference to drawings.

A tire 10 according to this embodiment is described below. FIG. 1A is a perspective view illustrating a cross-section of a part of a tire according to one embodiment of the invention. FIG. 1B is a cross-sectional view of a bead portion mounted on a rim. As illustrated in FIG. 1, the tire 10 according to the present embodiment has a cross-sectional shape that is substantially similar to those of conventional ordinary pneumatic rubber tires.

As illustrated in FIG. 1A, the tire 10 includes a tire case 17 that includes: a pair of bead portions 12 that contact a bead sheet portion 21 and a rim flange 22 of a rim 20 illustrated in FIG. 1B; side portions 14 that each outwardly extend from a bead portion 12 in the tire radial direction; and a crown portion 16 (outer circumferential portion) that connects the tire-radial-direction outer end of one side portion 14 and the tire-radial-direction outer end of the other side portion 14.

In the tire casing 17 according to the present embodiment, a resinous material including various additives and a thermoplastic elastomer which includes a hard segment (HS) and a soft segment (SS) and in which 55% or more of the molecular chain terminals are hard segments (HS) may be used, for example.

Although the tire case 17 is made of a single resinous material in the present embodiment, the invention is not limited to this configuration, and thermoplastic resinous materials having different properties may be used for the respective parts of the tire case 17 (for example, side portions 14, a crown portion 16 and bead portions 12), similar to conventional ordinary pneumatic rubber tires. Further, a reinforcing member (for example, a polymer or metal fiber, cord, non-woven fabric, or woven fabric) may be embedded in the tire case 17 (for example, in the bead portions 12, in the side portions 14 or in the crown portion 16), so as to reinforce the tire case 17 with the reinforcing member.

The tire case 17 according to the present embodiment is a member obtained by joining together a pair of tire case half parts (tire frame pieces) 17A formed only of a resinous material. Each tire case half part 17A is formed by producing an integrated body composed of one bead portion 12, one side portion 14 and a half-width part of the crown portion 16 by molding such as injection molding. The tire case 17 is formed by disposing the formed tire case half parts 17A, which have the same annular shape, to face to each other, and joining them together at the tire equatorial plane. The tire case 17 is not limited to those obtained by joining together two members, and may be formed by joining together three or more members.

Each of the tire case half parts 17A formed using at least the above-described resinous material may be shaped using, for example, vacuum molding, pressure forming, injection molding or melt casting. Therefore, vulcanization is unnecessary, the production process can greatly be simplified, and the forming time can be saved, as compared to the case of forming a tire case with rubber as in conventional techniques.

In the present embodiment, the tire case half parts 17A have a bilaterally symmetric shape, i.e., one of the tire case half parts 17A has the same shape as the other tire case half part 17A. Therefore, there is also an advantage in that only one type of mold is required for forming the tire case half parts 17A.

In the present embodiment, an annular bead core 18 made only of a steel cord similar to those used in conventional ordinary pneumatic tires is embedded in each of the bead portions 12, as illustrated in FIG. 1B. However, the invention is not limited to this configuration, and the bead core 18 may be omitted as long as it is ensured that the bead portion 12 has rigidity, and mounting on the rim 20 can be performed successfully. The bead core 18 may alternatively be formed using, for example, an organic fiber cord, a resin-coated organic fiber cord, or a hard resin, instead of a steel cord.

In the present embodiment, an annular sealing layer 24 formed of a material (for example, rubber) having a higher sealing property than that of the resinous material forming a part or the whole of the tire case 17 is provided on a part of the bead portion 12 that contacts the rim 20 or at least on a part of the bead portion 12 that contacts the rim flange 22 of the rim 20. The sealing layer 24 may also be provided in a part in which the tire case 17 (the bead portion 12) and the bead seat 21 contact each other. A material softer than the resinous material that forms a part or the whole of the tire case 17 may be used as the material having a higher sealing property than that of the resinous material that forms a part or the whole of the tire case 17. As rubbers usable for the sealing layer 24, the same types of rubbers as the rubbers used on the outer surfaces of the bead portions of conventional ordinary pneumatic rubber tires are preferably used. Another thermoplastic resin (thermoplastic elastomer) having a higher sealing property than that of the resinous material may be used. Examples of another thermoplastic resin include a polyurethane-based resin, a polyolefin-based resin, a polystyrene-based thermoplastic resin, or a polyester resin, or a blend of any of these resins with a rubber or an elastomer. It is also possible to use a thermoplastic elastomer, such as a polyester-based thermoplastic elastomer, a polyurethane-based thermoplastic elastomer, a polystyrene-based thermoplastic elastomer, a polyolefin-based thermoplastic elastomer, or a combination of two or more of these elastomers or a blend of any of these elastomers with a rubber.

As illustrated in FIG. 1, a reinforcing cord 26 having a higher rigidity than that of the resinous material forming a part or the whole of the tire case 17 is wound around the crown portion 16 in the circumferential direction of the tire case 17. The reinforcing cord 26 is helically wound to form a reinforcing cord layer 28 in a state in which at least a part of the reinforcing cord 26 is embedded in the crown portion 16 in cross-sectional view taken along the axial direction of tire case 17. A tread 30 formed of a material (for example, rubber) having a higher wear resistance than that of the resinous material forming a part or the whole of the tire case 17 is disposed at the tire-radial-direction outer circumferential side of the reinforcing cord layer 28.

Figure 2:
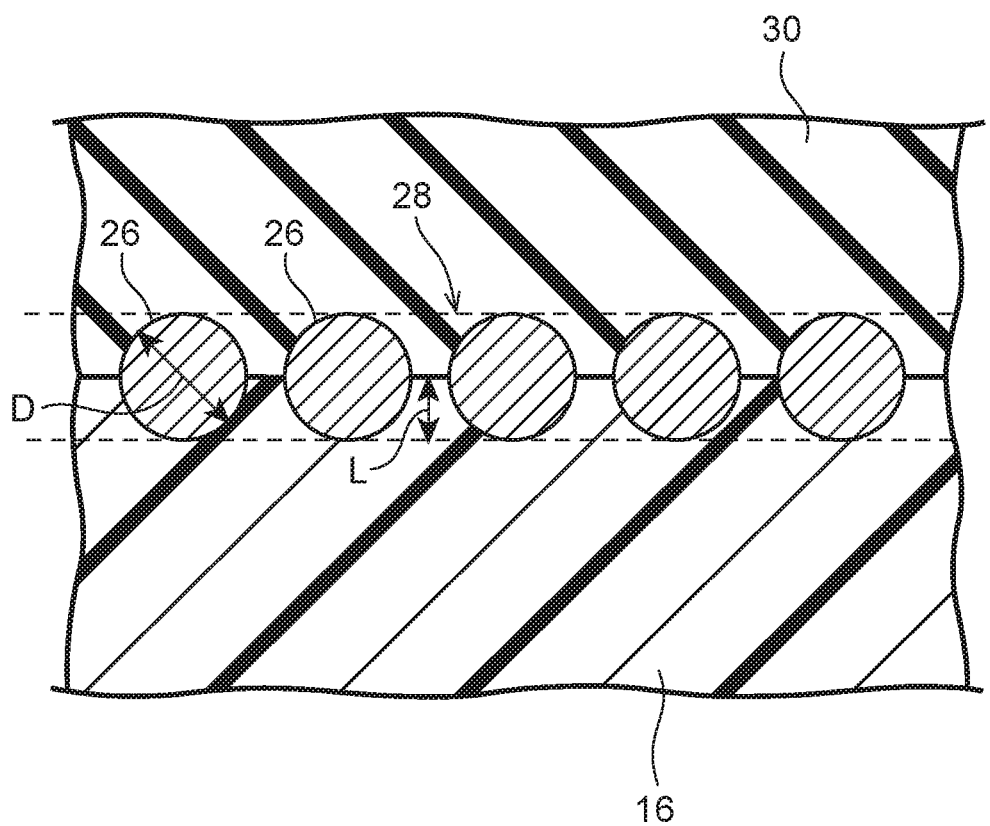
FIG. 2 is a cross-sectional view taken along a tire rotation axis that illustrates a state in which a reinforcing cord is embedded in a crown portion of a tire case of a tire according to a first embodiment.

The reinforcing cord layer 28 formed by the reinforcing cord 26 is described below with reference to FIG. 2. FIG. 2 is a cross-sectional view taken along the tire rotation axis, which illustrates a state in which the reinforcing cord is embedded in the crown portion of the tire case of the tire according to the first embodiment. As illustrated in FIG. 2, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 indicated by the intermittent lines in FIG. 2. The part of the reinforcing cord 26 that is embedded in the crown portion 16 is in close contact with the resinous material forming a part or the whole of the crown portion 16 (the tire case 17). A monofilament (single filament) of a metal fiber, an organic fiber, or the like, or a multifilament (stranded filament) in which such fibers are stranded, such as a steel cord composed of stranded steel fibers, may be used as the reinforcing cord 26. In the present embodiment, a steel cord is used as the reinforcing cord 26.

The depth L of embedding in FIG. 2 illustrates the depth of embedding of the reinforcing cord 26 in the tire case 17 (the crown portion 16) along the tire rotation axis direction. The depth L of embedding of the reinforcing cord 26 in the crown portion 16 is preferably equal to or greater than ⅕ of the diameter D of the reinforcing cord 26, and more preferably more than ½ of the diameter D of the reinforcing cord 26. It is most preferable that the entire reinforcing cord 26 is embedded in the crown portion 16. When the depth L of embedding of the reinforcing cord 26 is more than ½ of the diameter D of the reinforcing cord 26, the reinforcing cord 26 is less likely to drop off from the embedded portion due to the dimensions of the reinforcing cord 26. When the entire reinforcing cord 26 is embedded in the crown portion 16, the surface (the outer circumferential surface) becomes flat, whereby entry of air into an area around the reinforcing cord can be reduced even when a member is placed on the crown portion 16 in which the reinforcing cord 26 is embedded. The reinforcing cord layer 28 corresponds to a belt disposed on the outer circumferential surface of a carcass of a conventional pneumatic rubber tire.

As described above, the tread 30 is disposed on the tire-radial-direction outer circumferential side of the reinforcing cord layer 28. It is preferable that the same type of rubber as that used for conventional pneumatic rubber tires is used as the rubber used for the tread 30. A crown formed of another type of resinous material having higher wear resistance than that of the resinous material forming a part or the whole of the tire case 17 may be used, in place of the tread 30. In the tread 30, a tread pattern composed of plural grooves is formed on the contact surface that comes into contact with a road surface, similar to conventional pneumatic rubber tires.

A method of manufacturing a tire according to the present embodiment is described below.

(Tire Case Forming Process)

First, tire case half parts are formed using a resinous material including the thermoplastic resin elastomer according to the present embodiment, as described above. The forming of these tire cases is preferably performed using injection molding. Then, the tire case half parts supported by thin metal support rings are aligned to face each other. Subsequently, a jointing mold, not illustrated in the drawings, is placed so as to contact the outer circumferential surface of a butt portion of the tire case half parts. The jointing mold is configured to pressurize a region at or around the joint portion (the butt portion) of the tire case half parts 17A with a predetermined pressure. Then, the pressure is applied to the region at or around the joint portion of the tire case half parts at a temperature equal to or higher than the melting point (or softening point) of the resinous material that forms a part or the whole of the tire case. When the joint portion of the tire case half parts is heated and pressurized by the jointing mold, the joint portion is melted, and the tire case half parts are fused with each other, as a result of which the members are integrated to form the tire case 17. Although the joint portion of the tire case half parts is heated using the jointing mold in the present embodiment, the invention is not limited thereto; heating of the joint portion may be carried out using, for example, a separately provided high frequency heater, or the tire case half parts may be bonded by softening or melting the joint portion, in advance, via application of hot air, irradiation with infrared radiation, or the like, and applying a pressure to the joint portion using the jointing mold.

(Reinforcing Cord Member Winding Step)

Next, although not illustrated in figures, a reinforcing cord layer 28 may be formed on the outer circumferential side of the crown portion 16 of the tire case 17 by winding a heated reinforcing cord 26 on the outer circumferential surface of the crown portion 16 such that the heated reinforcing cord 26 is embedded in the outer circumferential surface of the crown portion 16, using a cord supplying apparatus equipped with a reel on which a reinforcing cord 26 is wound, a cord heating apparatus, various rollers and the like.

In this way, a reinforcing cord layer 28 is formed on the outer circumferential side of the crown portion 16 of the tire case 17 by winding the heated reinforcing cord 26 on the outer circumferential surface of the crown portion 16 such that the heated reinforcing cord 26 is embedded in the outer circumferential surface of the crown portion 16.

Then, a belt-shaped vulcanized tread 30 is wound on the outer circumferential surface of the tire case 17 for one revolution, and the tread 30 is bonded to the outer circumferential surface of the tire case 17 using, for example, an adhesive. For example, precured crowns known thus far for use in retreaded tires may be used as the tread 30. The present process is a process similar to the process of bonding a precured crown to the outer circumferential surface of a casing of a retreaded tire.

A tire 10 can be completed by bonding a sealing layer 24 formed only of a vulcanized rubber to the bead portion 12 of the tire case 17 using, for example, an adhesive.

(Effects)

In the tire 10 according to the present embodiment, a part or the whole of the tire case 17 includes a resinous material including a thermoplastic elastomer which includes a hard segment (HS) and a soft segment (SS) and in which 55% or more of the molecular chain terminals are hard segments (HS). Due to this configuration, the tire 10 according to the present embodiment has a desirable elastic modulus as well as an excellent low-loss property.

In the tire 10 according to the present embodiment, on the outer circumferential surface of the crown portion 16 of the tire case 17 formed using at least the resinous material, a reinforcing cord 26 having higher rigidity than that of the resinous material is helically wound along the circumferential direction. Due to this configuration, puncture resistance, cut resistance, and rigidity in the circumferential direction of the tire 10 improve. The improvement in the rigidity in the circumferential direction of the tire 10 prevents creeping of the tire case 17 formed using at least the resinous material.

In a cross-sectional view taken along the axial direction of the tire case 17 (the cross-section illustrated in FIG. 1), at least a part of the reinforcing cord 26 is embedded in the outer circumferential surface of the crown portion 16 of the tire case 17 formed using at least the resinous material, and is in close contact with the resinous material. Due to this configuration, incorporation of air during manufacture is suppressed, and movement of the reinforcing cord 26 due to, for example, a force applied at the time of running is suppressed. Accordingly, separation between the reinforcing cord 26, the tire case 17, and the tread 30 is reduced, and the durability of the tire 10 is improved.

As illustrated in FIG. 2, the depth L of embedding of the reinforcing cord 26 is set to be equal to or greater than $\frac{1}{5}$ of the diameter D. Due to this configuration, the incorporation of air during manufacture is effectively reduced, and movement of the reinforcing cord 26 due to, for example, a force applied at the time of running is further reduced.

Since the annular bead core 18 formed only of a metal material is embedded in the bead portion 12, the tire case 17 is strongly fixed to the rim 20, i.e., the tire 10 is strongly fixed to the rim 20, similar to conventional pneumatic rubber tires.

Moreover, since the sealing layer 24 formed only of a rubber material having higher sealing ability than that of the resinous material forming a part or the whole of the tire case 17 is disposed in a region of the bead portion 12 that contacts the rim 20, sealing between the tire 10 and the rim 20 is improved. Therefore, compared with cases in which sealing is carried out only with the rim 20 and the resinous material forming a part or the whole of the tire case 17, air leakage from inside the tire is further reduced. Further, fittability to a rim is improved by the provision of the sealing layer 24.

Although a configuration in which the reinforcing cord 26 is heated is adopted in the first embodiment, a configuration in which the outer circumference of the reinforcing cord 26 is coated with the same resinous material as that of the tire case 17, for example, may be adopted. In this case, by heating the coated resinous material along with the reinforcing cord 26 when the coated reinforcing cord is wound on the crown portion 16 of the tire case 17, incorporation of air during embedding into the crown portion 16 can effectively be reduced.

Helically winding the reinforcing cord 26 is easy from the viewpoint of manufacture. However, a method in which reinforcing cords 26 are provided such that reinforcing cords aligned in the width direction are discontinuous may also be contemplated.

The tire 10 in the first embodiment is what is referred to as a tubeless tire, in which an air chamber is formed between the tire 10 and the rim 20 by fitting the bead portions 12 to the rim 20. However, the invention is not limited to this configuration, and a complete tube shape may also be adopted.

Although modes for carrying out the invention are described above with reference to embodiments, these embodiments are examples, and may be practiced with various modifications within a range not departing from the spirit of the invention. Of course, the protection scope of the invention is not limited to these embodiments.

EXAMPLES

The invention is more specifically described below by reference to examples. However the invention is not limited thereto.

Example 1

Hard Segment (HS): Synthesis of PA12 (NYLON 12) Having Modifications at Both Terminals 54.6 g of 12-aminododecanoic acid, 750 g of aminododecanolactam and 46 g of dodecanedioic acid, which were manufactured by Aldrich, were added into a reaction vessel having a volume of 2 liters and equipped with a stirrer, a nitrogen gas inlet and a condensation water discharge port, and the air inside the vessel was sufficiently replaced with nitrogen. Then, the temperature was increased to 280° C., and a reaction was allowed to proceed for 4 hours at an elevated pressure elevated by 0.6 MPa. After the pressure was relieved, the reaction was allowed to proceed for another one hour under a nitrogen stream, whereby a white solid, which was a desired PA12 polymer (PA12 having modifications at both terminals) having a number average molecular weight of about 3,900, was obtained.

Production of Thermoplastic Elastomer 300 g of the obtained PA12 having modifications at both terminals was weighed, and 154 g of polyoxypropylene diamine (ELASTAMINE RP-2009 manufactured by Huntsman) was added thereto, followed by stirring for 5 hours at 230° C. Thereafter, 9 g of the PA12 having modifications at both terminals was further added thereto, followed by stirring for one hour. 1 g of IRGANOX 1010 (manufactured by BASF) was added thereto, whereby a polyamide elastomer in white color was obtained.

The obtained polyamide elastomer was pelletized, and injection-molded at 220° C., thereby obtaining a sample piece. Various measurements were carried out using a sample obtained by stamping out a test piece from the sample piece.

Example 2

A thermoplastic elastomer was obtained in the same manner as that in Example 1, except that the amount of the PA12 having modifications at both terminals added in the production of a thermoplastic elastomer was changed to 13 g.

Example 3

Hard Segment (HS): Synthesis of PA12 (NYLON 12) Having a Modification at One Terminal 54.6 g of 12-aminododecanoic acid, 750 g of aminododecanolactam and 34.7 g of dodecanoic acid, which were manufactured by Aldrich, were added into a reaction vessel having a volume of 2 liters and equipped with a stirrer, a nitrogen gas inlet and a condensation water discharge port, and the air inside the vessel was sufficiently replaced with nitrogen. Then, the temperature was increased to 280° C., and a reaction was allowed to proceed for 4 hours at an elevated pressure elevated by 0.6 MPa. After the pressure was relieved, the reaction was allowed to proceed for another one hour under a nitrogen stream, whereby a white solid, which was a desired PA12 polymer having a modification at one terminal and having a number average molecular weight of about 3,900, was obtained.

Production of Thermoplastic Elastomer 300 g of the PA12 obtained in Example 1 and modifications at both terminals, and 9 g of the above-obtained PA12 having a modification at one terminal were weighed out, and 154 g of polyoxypropylene diamine (manufactured by Huntsman Corp., ELASTAMINE RP-2009) was added thereto, followed by stirring for 6 hours at 230° C. 1 g of IRGANOX 1010 (manufactured by BASF) was added thereto, whereby a polyamide elastomer in white color was obtained.

The obtained polyamide elastomer was pelletized, and injection-molded at 220° C., thereby obtaining a sample piece. Various measurements were performed using a sample obtained by stamping out a test piece from the sample piece.

Example 4

A thermoplastic elastomer was obtained in the same manner as that in Example 3, except that the amount of the PA12 having a modification at one terminal added in the production of a thermoplastic elastomer was changed to 13 g.

Example 5

A thermoplastic elastomer was obtained in the same manner as that in Example 3, except that the amount of the PA12 having a modification at one terminal added in the production of a thermoplastic elastomer was changed to 18 g, and that the soft segment used for the reaction was changed from polyoxypropylene diamine to polypropylene glycol (having a molecular weight of 2,000, manufactured by Wako Pure Chemical Industries, Ltd.).

Example 6

Hard Segment (HS): Synthesis of PA6 (NYLON 6) Having Modifications at Both Terminals 400 g of caprolactam manufactured by Aldrich, 51 g of dodecanedioic acid and 62 g of aminohexanoic acid were added into a reaction vessel having a volume of 2 liters and equipped with a stirrer, a nitrogen gas inlet and a condensation water discharge port, and the air inside the vessel was sufficiently replaced with nitrogen. Then, the temperature was increased to 280° C., and a reaction was allowed to proceed for 4 hours at an elevated pressure elevated by 0.6 MPa. After the pressure was relieved, the reaction was allowed to proceed for another one hour under a nitrogen stream, and washing with water was performed, as a result of which a white solid, which was a desired PA6 polymer (PA6 having modifications at both terminals) having a number average molecular weight of about 2,000, was obtained.

Synthesis of Hard Segment (HS): Single Terminal-Modified PA6 (NYLON 6)

400 g of caprolactam, 44 g of dodecanoic acid and 62 g of aminohexanoic acid, which were manufactured by Aldrich, were added into a reaction vessel having a volume of 2 liters and equipped with a stirrer, a nitrogen gas inlet and a condensation water discharge port, and the air inside the vessel was sufficiently replaced with nitrogen. Then, the temperature was increased to 280° C., and a reaction was allowed to proceed for 4 hours at an elevated pressure elevated by 0.6 MPa. After the pressure was relieved, the reaction was allowed to proceed for another one hour under a nitrogen stream, and washing with water was performed, as a result of which a white solid, which was a desired PA6 polymer having a modification at one terminal and having a number average molecular weight of about 2,000, was obtained.

Production of Thermoplastic Elastomer 300 g of the above-obtained PA6 having modifications at both terminals and 25 g of the above-obtained PA6 having a modification at one terminal were weighed out, and 154 g of XTJ-542 manufactured by Huntsman was added thereto, followed by stirring for 6 hours at 230° C. 1 g of IRGANOX 1010 was added thereto, whereby a polyamide elastomer in white color was obtained.

The obtained polyamide elastomer was pelletized, and injection-molded at 260° C., thereby obtaining a sample piece. Various measurements were performed using a sample obtained by stamping out a test piece from the sample piece.

Example 7

68.2 g of dodecanedioic acid (DDA), 18 g of hexamethylene diamine (HMDA), 280 g of PPG/PTMG/PPG (trade name: ELASTAMINE (registered trademark) RT-1000 manufactured by HUNTSMAN, a triblock polyetherdiamine which is a terpolymer containing a polymer forming a soft segment, a constituent unit derived from polytetramethylene ether glycol (TMG) and a constituent unit derived from polypropylene glycol (PPG) and which has an amino group at both terminals), 150 g of purified water, and 0.7 g of sodium hypophosphite were added into a reaction vessel having a volume of 2 liters and equipped with a stirrer, a nitrogen gas inlet and a condensation water discharge port, and mixed.

After replacement with nitrogen atmosphere, this mixture was heated to 230° C. in a confined-pressure condition. After the pressure inside the vessel reached 0.5 MPa, the pressure was gradually relieved, followed by stirring for 5 hours at 230° C. under a nitrogen stream, as a result of which a polyamide elastomer was obtained.

The obtained polyamide elastomer was pelletized, and was then subjected to extraction with isopropanol for 12 hours while heating, thereby removing unreacted monomers. The polyamide elastomer was injection-molded at 240° C., and thereby obtaining a sample piece. Various measurements were performed using a sample obtained by stamping out a test piece from the sample piece.

Comparative Example 1

A thermoplastic elastomer was obtained in the same manner as that in Example 1, except that the production of a thermoplastic elastomer was carried out according to the following method.

Production of Thermoplastic Elastomer 300 g of the above-obtained PA12 having modifications at both terminals was weighed out, and 154 g of polyoxypropylene diamine (ELASTAMINE RP-2009 manufactured by Huntsman) was added thereto, followed by stirring for 6 hours at 230° C. 3 g of IRGANOX 1010 was added thereto, whereby a polyamide elastomer in white color was obtained.

Comparative Example 2

A thermoplastic elastomer was obtained in the same manner as that in Example 1, except that the amount of the hard segment (PA12 having modifications at both terminals) added in the production of a thermoplastic elastomer was changed from 300 g to 309 g, and that the further addition was not performed (that is, the whole amount, including the amount further added in Example 1, was added at once).

Evaluation

Evaluations were carried out with respect to the following items, using the thermoplastic elastomers obtained in the Examples and the Comparative Examples. The results are indicated in Table 1.

(Elastic Modulus)

The tensile modulus of elasticity as defined in JIS K7113: 1995 (hereinafter, the "elastic modulus" as used herein refers to a tensile modulus of elasticity, unless particularly specified otherwise) was measured. Next, the measured value of the elastic modulus obtained according to the above measurement method was converted to a relative value by calculation, taking the value of the elastic modulus in Comparative Example 1 as 100. A higher elastic modulus is more preferable.

(Elongation at Break (Eb))

The tensile elongation at break (Eb) as defined by JIS K7113:1995 was measured. Next, the measured value of the elongation at break obtained according to the above measurement method was converted to a relative value by calculation, taking the value of the elongation at break in Comparative Example 1 as 100. A larger value of Eb indicates higher resistance to breakage (durability).

(Low-Loss Property)

A disc-shaped test piece having a diameter of 8 mm was stamped out from a 2 mm-thick sample piece, and used for measurement. The loss tangent (tan δ) was measured using a viscoelasticity analyzer (manufactured by Rheometrics, Inc.) at a temperature of 30° C., a strain of 1%, and a frequency of 20 Hz. The measured value of the tan δ obtained according to the above measurement method was converted to a relative value by calculation, taking the value of the tan δ in Comparative Example 1 as 100. A smaller value indicates more improved low-loss property.

TABLE 1

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Elastomer | TPA | TPA | TPA | TPA | TPA | TPA | TPA | TPA | TPA |
| PA | PA12 | PA12 | PA12 | PA12 | PA12 | PA6 | PA612 | PA12 | PA12 |
| Terminal HS Percentage (%) | 55 | 74 | 88.5 | 98 | 63 | 97 | 82 | 47 | 53 |
| Reactive Functional Group of SS | $NH_2$ | $NH_2$ | $NH_2$ | $NH_2$ | OH | $NH_2$ | $NH_2$ | $NH_2$ | $NH_2$ |
| Elastic Modulus | 101 | 102 | 106 | 110 | 108 | 115 | 121 | 100 | 100 |
| Elongation at Break (Eb) | 101 | 100 | 99 | 98 | 98 | 130 | 125 | 100 | 100 |
| Low-loss Property | 98 | 91 | 87 | 85 | 94 | 82 | 96 | 100 | 100 |

As is understood from Table 1, the Examples, in which 55% or more of the molecular chain terminals of the thermoplastic elastomer are hard segments (HS), compatibly achieved excellent elastic modulus and low-loss property, compared to the Comparative Examples, which did not satisfy the above requirement. Furthermore, in the Examples, evaluation results equivalent to or better than the Comparative Examples were also obtained with respect to the elongation at break (Eb); in other words, excellent resistance to breakage (durability) was obtained in the Examples.

The disclosure of Japanese Patent Application No. 2014-199162 is incorporated herein by reference in its entirety.

All publications, patent applications, and technical standards mentioned in the present specification are herein incorporated by reference to the same extent as if each individual publication, patent application, or technical standard was specifically and individually indicated to be incorporated by reference.

EXPLANATION OF REFERENCE NUMERALS

10: Tire
12: Bead portion
16: Crown portion (Outer circumferential portion)
17: Tire case (tire frame)
18: Bead core
20: Rim
21: Bead seat
22: Rim flange
24: Sealing layer (sealing section)
26: Reinforcing cord (reinforcing cord member)
28: Reinforcing cord layer
30: Tread
D: Diameter of reinforcing cord (diameter of reinforcing cord member)
L: Depth of embedding of reinforcing cord (depth of embedding of reinforcing cord member)

The invention claimed is:

1. A tire comprising a circular tire frame including a resinous material,
the resinous material including a thermoplastic elastomer including a hard segment (HS) and a soft segment (SS), and 55% or more of molecular chain terminals of the thermoplastic elastomer being hard segments (HS); wherein the thermoplastic elastomer is at least one selected from the group consisting of a polyurethane-based thermoplastic elastomer and a polyamide-based thermoplastic elastomer.

2. The tire according to claim 1, wherein a percentage of molecular chain terminals of the thermoplastic elastomer that are hard segments (HS) is 60% or more.

3. The tire according to claim 1, wherein the thermoplastic elastomer is a polyamide-based thermoplastic elastomer.

4. The tire according to claim 1, wherein an amount of reactive functional groups of soft segments remaining at terminals of the thermoplastic elastomer is 10 mmol/kg or less.

5. The tire according to claim 4, wherein each of the reactive functional groups is selected from the group consisting of —OH, —$NH_2$ and —COOH.

6. The tire according to claim 1, wherein a number average molecular weight of the thermoplastic elastomer is from 15,700 to 200,000.

7. The tire according to claim 1, wherein a content of hard segments in the thermoplastic elastomer is from 5 to 95% by mass with respect to a total amount of the thermoplastic elastomer.

8. The tire according to claim 1, wherein a content of soft segments in the thermoplastic elastomer is from 10 to 90% by mass with respect to a total amount of the thermoplastic elastomer.

9. The tire according to claim 1, wherein a mass ratio (HS/SS) of hard segments (HS) to soft segments (SS) in the thermoplastic elastomer is in a range of from 30/70 to 80/20.

10. The tire according to claim 1, wherein a content of resin component in the resinous material is 50% by mass or more with respect to a total amount of the resinous material.

11. The tire according to claim 1, wherein a tensile strength at yield of the resinous material is 5 MPa or more.

12. The tire according to claim 1, wherein a tensile elongation at yield of the resinous material is 10% or more.

13. The tire according to claim 1, wherein a tensile elongation at break of the resinous material is 50% or more.

* * * * *